(12) United States Patent
Billman et al.

(10) Patent No.: US 9,467,020 B2
(45) Date of Patent: Oct. 11, 2016

(54) ACTUATOR CASING

(71) Applicant: Johnson Electric S.A., Murten (CH)

(72) Inventors: Christopher Joseph Billman, Springfield, TN (US); Tahn Minh Bui, Hendersonville, TN (US)

(73) Assignee: JOHNSON ELECTRIC S.A., Murten (CH)

( * ) Notice: Subject to any disclaimer, the term of this patent is extended or adjusted under 35 U.S.C. 154(b) by 733 days.

(21) Appl. No.: 13/868,839

(22) Filed: Apr. 23, 2013

(65) Prior Publication Data

US 2013/0285484 A1 Oct. 31, 2013

Related U.S. Application Data

(60) Provisional application No. 61/638,309, filed on Apr. 25, 2012.

(51) Int. Cl.
*H02K 5/24* (2006.01)
*H02K 7/116* (2006.01)

(52) U.S. Cl.
CPC .............. *H02K 5/24* (2013.01); *H02K 7/1166* (2013.01)

(58) Field of Classification Search
CPC .............................. H02K 5/24; H02K 7/1166
USPC ...... 310/51, 89, 91, 418; 248/638, 669, 676, 248/671, 674
IPC ....................................................... H02K 5/24
See application file for complete search history.

(56) References Cited

U.S. PATENT DOCUMENTS

| | | | | |
|---|---|---|---|---|
| 2,478,704 A | * | 8/1949 | Morris, Jr. ................ | F16F 1/38 248/606 |
| 3,206,148 A | * | 9/1965 | Longsworth .......... | F04D 29/646 248/621 |
| RE31,525 E | * | 2/1984 | Boyd, Jr. ................. | F16M 1/04 248/581 |
| 6,357,247 B1 | * | 3/2002 | Moretti ................... | F24F 1/027 62/262 |
| 6,729,598 B2 | * | 5/2004 | Folliot ................ | B60N 2/0232 248/671 |
| 2013/0285484 A1 | * | 10/2013 | Billman ............... | H02K 7/1166 310/51 |

* cited by examiner

*Primary Examiner* — John K Kim
(74) *Attorney, Agent, or Firm* — Muncy, Geissler, Olds & Lowe, P.C.

(57) ABSTRACT

A casing configured for receiving a motor. The motor includes a shaft, two end plates substantially perpendicular to the shaft, and two bosses respectively protruding from the two end plates along the shaft. The casing includes two abutting plates. Each abutting plate includes an arcuate resisting surface that substantially faces the other abutting plate for abutting against a corresponding end plate. The distance between the two resisting surfaces increases from the middle thereof to the side thereof. Each abutting plate comprises a notch formed in an edge thereof and extending along the middle of the corresponding resisting surface for receiving a corresponding boss.

16 Claims, 4 Drawing Sheets

ACTUATOR CASING

CROSS REFERENCE TO RELATED APPLICATIONS

This non-provisional patent application claims priority under 35 U.S.C. §119(e) from Provisional Patent Application No. 61/638,309 filed in USA on Apr. 25, 2012, the entire contents of which are incorporated herein by reference.

FIELD OF THE INVENTION

The present invention relates to casings and in particularly, to an actuator casing housing a motor.

BACKGROUND OF THE INVENTION

Many electronic devices employ a motor or an actuator incorporating a motor in which the motor has two plane end surfaces and two cylindrical bosses extending from the two end surfaces along the shaft of the motor. The casing of the electronic device defines a compartment that is usually surrounded at least by two plane plates to receive the motor. The two plates face each other and respectively contact the two end surfaces of the motor. As such, during operation, vibration generated by the motor is transmitted to the casing via at least the whole plane plate, which causes intense vibration and high noise to emanate from the electronic device.

SUMMARY OF THE INVENTION

The present invention aims to provide a new casing having reduced transmission of vibrations from the motor to the casing. This is achieved by providing a casing having two arcuate abutting plates for sandwiching the motor therebetween, with the two end surfaces of the motor contacting the abutting plates in a line-contact manner.

Accordingly, in one aspect thereof, the present invention provides a casing for receiving a motor. The motor includes a shaft, two end plates substantially perpendicular to the shaft, and two bosses respectively protruding from the two end plates along the shaft. The casing includes two abutting plates. Each abutting plate includes an arcuate resisting surface that faces substantially to the other abutting plate for abutting against a corresponding end plate. The distance between the two resisting surfaces increases from the middle thereof to the side thereof. Each abutting plate includes a notch that recesses from an edge thereof and is exposed on the middle of the corresponding resisting surface for receiving a corresponding boss.

Compared to the casing described in the background, as the contact area between the casing and the motor is small, only a little vibration can be transmitted to the casing when the motor is in operation.

Preferably, the casing of further includes a bottom plate from where the two abutting plates extend.

Preferably, the casing further includes a plurality of first resisting pieces protruding from the bottom plate, wherein the plurality of first abutting pieces are arranged at both sides of a line that connecting the center of the two notches for abutting against the motor so that the motor is spaced from the bottom plate. As such, the motor can be received steadier in the casing.

Preferably, two said first abutting pieces are arranged at each side of the line and are arranged respectively at a position near a corresponding abutting plate, each first abutting piece is shaped like a triangular prism and is configured to contact the motor by a point-contact way.

Preferably, the casing further includes two supporting pieces protruding from the bottom plate, wherein the two supporting pieces are respectively connected to a surface of a corresponding abutting plate that faces away from the other abutting plate. In this way, the abutting plate is strengthened.

Preferably, each supporting piece is V-shaped and the cross connecting portion of the supporting piece is connected to the middle of the said surface.

Preferably, the casing further includes a protrusion protruding from the resisting surface of an abutting plate, the top end of the protrusion is equal to or below the bottom of the corresponding notch, and the protrusion includes an arcuate surface that faces substantially to the other abutting plate. As such, the motor will not rotate in the casing.

Preferably, the casing further includes a top plate facing to the bottom plate.

Preferably, the casing further includes a plurality of second resisting pieces protruding from the top plate, wherein the second resisting pieces are arranged at both sides of a line that connecting the center of the two notches for abutting against the motor so that the motor is spaced from the top plate. As such, the motor can be received steadier in the casing.

Preferably, a said second resisting piece is arranged at each side of the line, each second resisting piece is shaped like a triangular prism and is configured to contact the motor in a point-contact way.

Preferably, the casing includes a first part and a detachable second part, the first part includes the bottom plate and the two abutting plates, and the second part includes the top plate.

Accordingly, in another aspect thereof, the present invention also provides an electronic device that includes a motor and a casing housing the motor. The motor includes a shaft, two end plates substantially perpendicular to the shaft, and two bosses respectively protruding from the two end plates along the shaft. The casing includes two abutting plates. Each abutting plate includes an arcuate resisting surface that faces substantially to the other abutting plate and abuts against a corresponding end plate. In a direction parallel to the shaft, the distance between the two resisting surfaces increases from the middle thereof to the side thereof. Each abutting plate includes a notch that recesses from an edge thereof and is exposed on the middle of the corresponding resisting surface. The two bosses are received respectively in the two notches.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
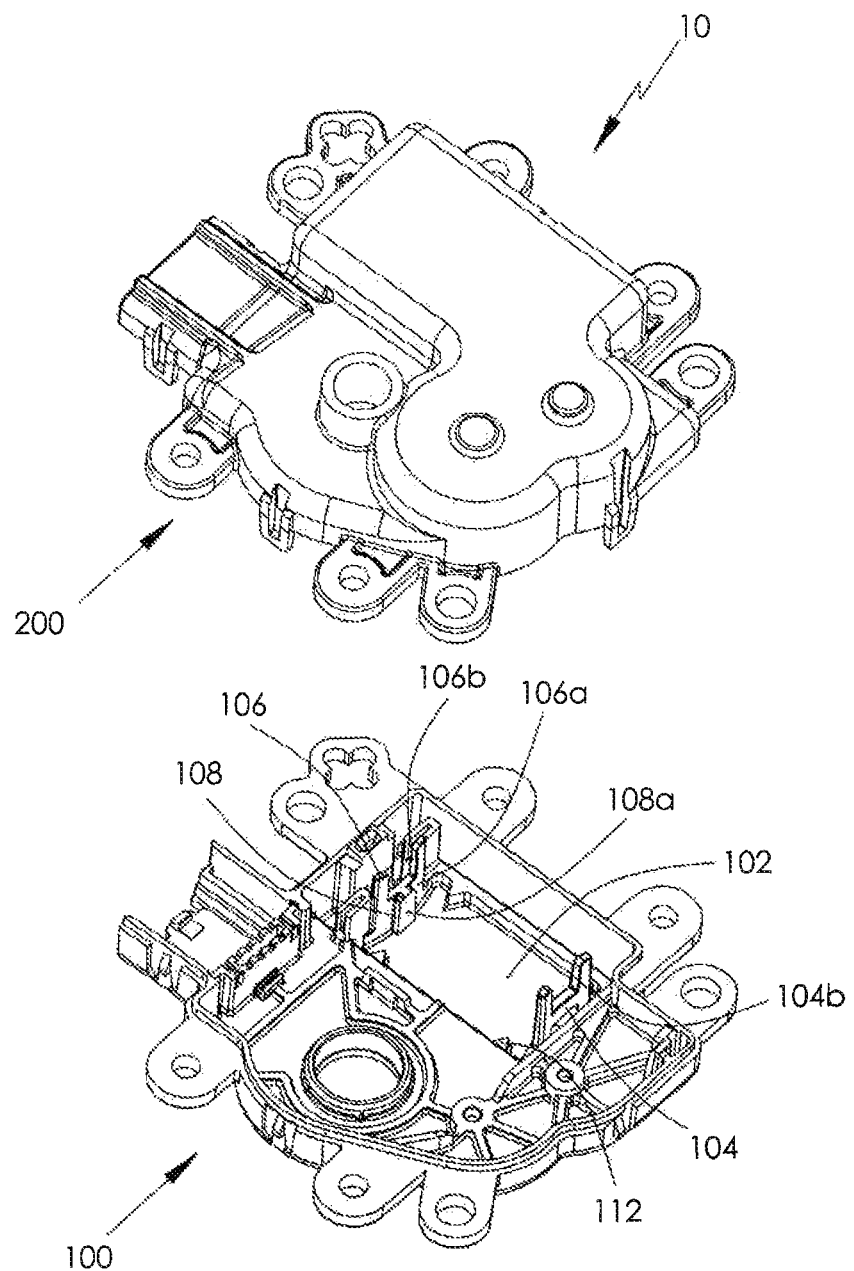
FIG. 1 illustrates an exploded view of a casing, according to an embodiment, including a first part and a second part.
Figure 2:
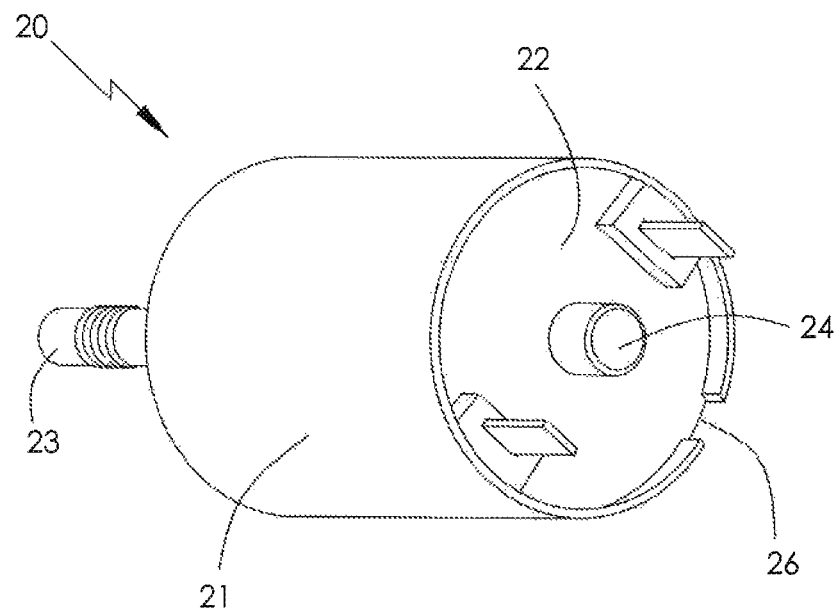
FIG. 2 illustrates a motor that can be received in the casing of FIG. 1.
Figure 3:
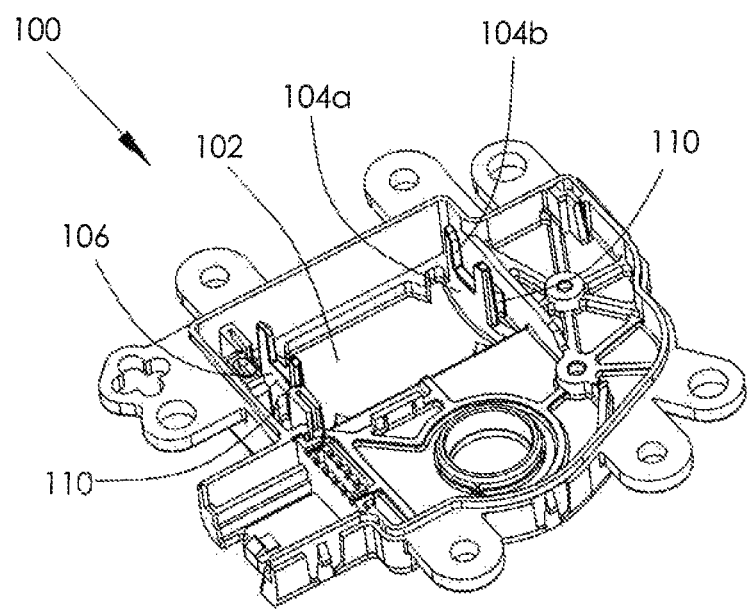
FIG. 3 illustrates the first part of the casing of FIG. 1.
Figure 4:
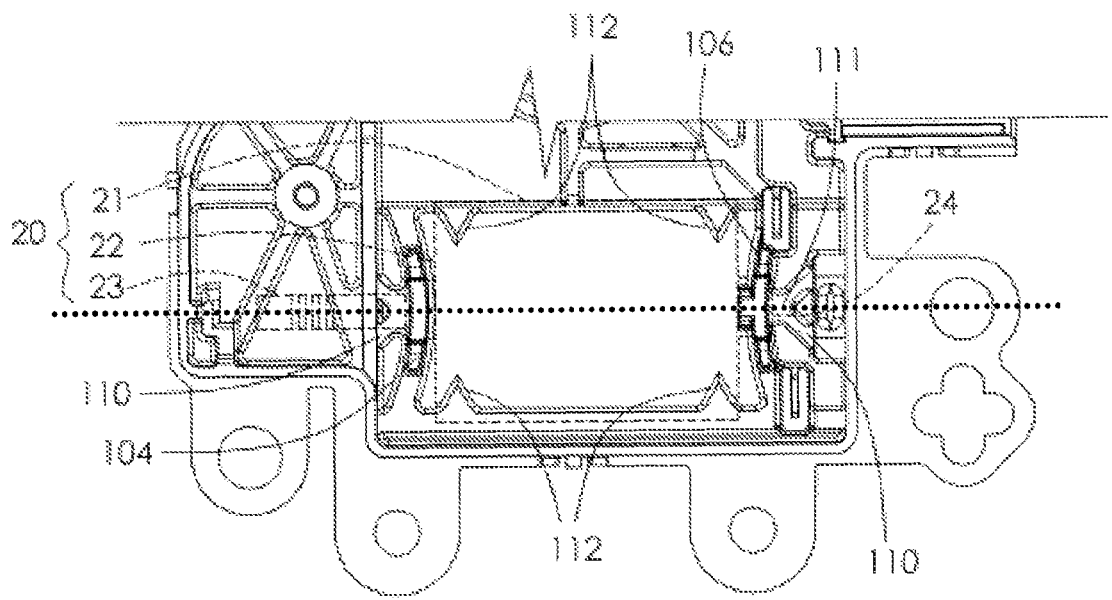
FIG. 4 is a plan view of the first part of the casing, with the motor of FIG. 2, shown by dotted lines, assembled therein.

A casing 10, according to the present invention, is used for receiving a motor 20. The motor 20 includes a main body 21 and a shaft 23. The shaft supports a worm or spur gear for driving a gear train of the actuator. The main body 21 includes two plane end plates 22 that are substantially perpendicular to the shaft 23 and two cylindrical bosses 24 respectively protruding from the two end plates 22 along the shaft 23. The main body 21 defines a gap 26 at an end thereof. The casing 10 includes a first part 100 and a second part 200 coupled together to form a compartment for receiving the motor 20 therein.

The first part 100 includes a bottom plate 102, a first abutting plate 104, a second abutting plate 106, a protrusion 108, two supporting pieces 110, and four first resisting pieces 112. The first abutting plate 104 and the second abutting plate 106 perpendicularly extend from the bottom plate 102. The first abutting plate 104 includes a first arcuate resisting surface 104a substantially facing the second abutting plate 106. The first abutting plate 104 has a first notch 104h formed in an edge that is remote from the bottom plate 102 and extending, along the middle of the first resisting surface 104a, towards the bottom plate 102. The second abutting plate 106 includes a surface 106a substantially facing the first abutting plate 104, and has a second notch 106b formed in an edge that is remote from the bottom plate 102 and extending along the middle of the surface 106a, towards the bottom plate 102. The protrusion 108 protrudes from the surface 106a. The top of the protrusion 108 is equal to or below the bottom of the second notch 106b. The protrusion 108 includes a second arcuate resisting surface 108a that substantially faces the first abutting plate 104. In a direction parallel to the shaft 23, the distance between first resisting surface 104a and the second resisting surface 108a gradually increases from the middle of the two resisting surfaces to the sides of the two resisting surfaces.

The supporting pieces 110 extend perpendicularly from the bottom plate 102. Each supporting piece 110 is V-shaped and has a cross connecting portion 111 at the tip thereof. Each cross connecting portion 111 is connected to a surface of an abutting plate 104, 106 that faces away from the corresponding resisting surface 104a, 108a for supporting the corresponding abutting plates 104, 106. Each first resisting piece 112 protrudes from the bottom plate 102 and is shaped like a triangular prism. Two first resisting pieces 112 are arranged on one side of a line (not shown) passing through the center of the first notch 104b and the center of the second notch 106b, while the other two resisting pieces are arranged on the other side with the edge thereof facing each other.

Figure 5:
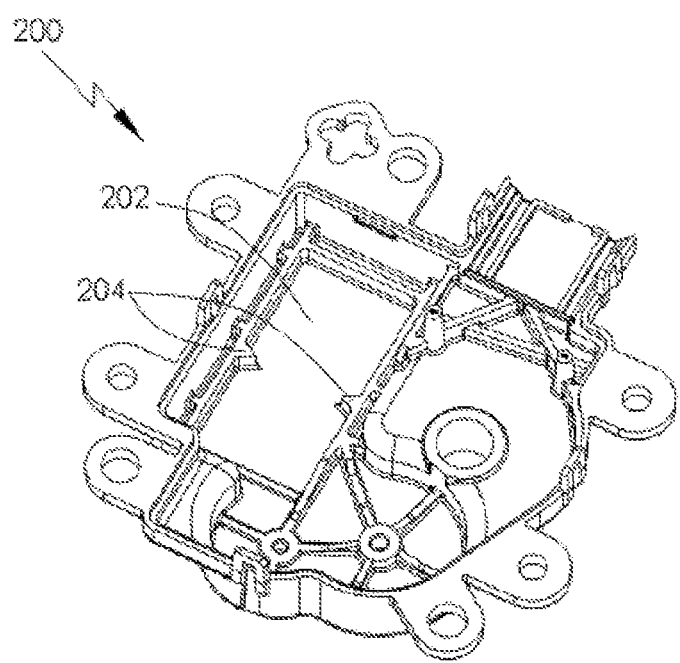
FIG. 5 illustrates the second part of the casing of FIG. 1.

As shown in FIG. 5, the second part 200 of the casing includes a top plate 202 and two second resisting pieces 204 protruding from the top plate 202. Each second resisting piece 204 also has the shape of a triangular prism and is arranged on a corresponding side of the line passing through the center of the first notch 104b and the center of the second notch 106b.

Figure 6:
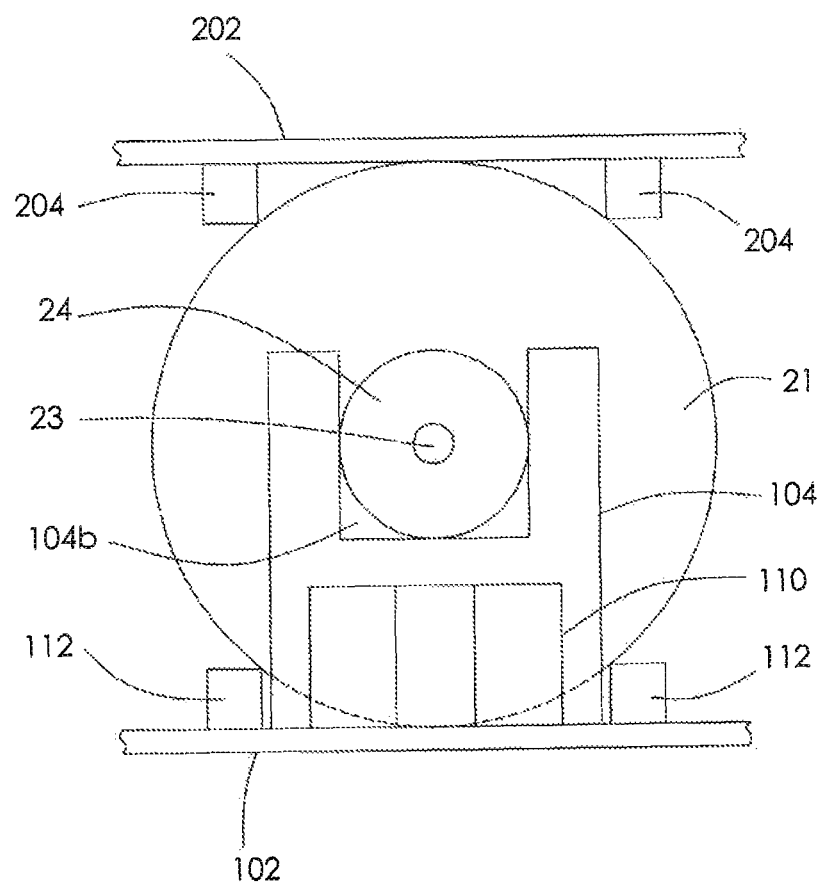
FIG. 6 is an enlarged schematic sectional view of a portion of the casing with the motor housed therein.

As shown in FIG. 6, when assembled, the motor 20 is received in a compartment formed by the bottom plate 102, the first abutting plate 104, and the second abutting plate 106. The two bosses 24 are received in the first and second notches 104b, 106b respectively, while the two end plates 22 abut against the first and second resisting surfaces 104a, 108a respectively. The protrusion 108 is received in the gap 26. As the first and second resisting surfaces 104a, 108a are both arcuate, the two plane end plates 22 of the motor contact the two resisting surfaces 104a, 108a in a line-contact manner, which reduces the contact area between the two resisting surfaces 104a, 108a and the two end plates 22. The first resisting pieces 112 hold the two axial sides of the main body 21 of the motor in a point-contact manner so that the main body 21 is spaced from the bottom plate 102. When the second part 200 of the casing is connected to the first part 100, the second resisting pieces 204 abut against the middle part of the main body 21 of the motor in a point-contact manner, such that the main body 21 is spaced from the top plate 202. In this way, the main body 21 is firmly received in the casing 10 in a point-contact manner, which reduces or minimizes the contact area between the casing 10 and main body 21. As such, compared to casings of the prior art, only a small portion of the vibration generated by the motor 20 is transmitted to the casing 10.

The protrusion 108 prevents the motor 20 from rotating; however, the protrusion 108 may be omitted when the bosses 24 are fixedly received in the first and second notches 104b, 106b. In that arrangement, the surface 106a can be made arcuate so that it performs the function of the second resisting surface 108a. Also, when the motor 20 is fixedly sandwiched between the first resisting surface 104a and the surface 106, the bosses 24 can be loosely received in the first and second notches 104b, 106b.

It should be understood that the number, configuration, and position of the first and second resisting pieces 112, 204 is not limited to the arrangement shown in the present embodiment as long as they contact the main body 21 in a line-contact manner to reduce the contact area. Also, besides point-contact, it should be understood the way that the first and second resisting pieces 112, 204 contact the motor 20 can also be in a line-contact or a surface-contact manner, as long as the area of the contact is small to reduce the transmission of vibrations.

It should be understood also that the shape of the supporting piece 110 is not limited to the arrangement shown in the present embodiment. The supporting pieces 110 may be omitted when the first and second resisting plates 104, 106 are strong enough.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A casing, configured for receiving a motor that comprises a shaft, two end plates substantially perpendicular to the shaft, and two bosses respectively protruding from the two end plates along the shaft, the casing comprising:

two abutting plates, each abutting plate comprising an arcuate resisting surface that substantially faces the other abutting plate for abutting against a corresponding end plate, a notch formed in an edge thereof and extending along the middle of the corresponding resisting surface for receiving a corresponding boss, and lateral ends disposed on opposite sides of the corresponding resisting surface, wherein the distance between the two resisting surfaces increases from the middle to the lateral ends of the resisting surfaces of the abutting plates, an arc of the resisting surface is formed between the lateral ends thereof, and the casing further comprises a bottom plate, wherein the two abutting plates extend from the bottom plate, and a protrusion protruding from the resisting surface of an abutting plate, the top end of the protrusion is equal to or below the bottom of the corresponding notch, and the protrusion comprises an arcuate surface that substantially faces the other abutting plate.

2. The casing of claim 1, further comprising a plurality of first resisting pieces protruding from the bottom plate, wherein the plurality of first resisting pieces are arranged on a same side of a line passing through the centers of the two notches for abutting against the motor so that the motor is spaced from the bottom plate.

3. The casing of claim 2, wherein two said first resisting pieces are arranged on each side of the line and are arranged respectively at a position near a corresponding abutting plate, each first resisting piece being shaped like a triangular prism and configured to contact the motor in a point-contact manner.

4. The casing of claim 1, further comprising two supporting pieces protruding from the bottom plate, wherein the two supporting pieces are respectively connected to a surface of a corresponding abutting plate that faces away from the other abutting plate.

5. The casing of claim 4, wherein each supporting piece is V-shaped with the tip of the V connected to the middle of said surface.

6. The casing of claim 1, further comprising a top plate facing the bottom plate.

7. The casing of claim 6, further comprising a plurality of second resisting pieces protruding from the top plate, wherein the second resisting pieces are arranged on two opposite sides of the line for abutting against the motor so that the motor is spaced from the top plate.

8. The casing of claim 7, wherein at least one of said second resisting pieces is arranged on each side of the line, each second resisting piece is shaped like a triangular prism and is configured to contact the motor in a point-contact manner.

9. The casing of claim 6, wherein the casing comprises a first part and a detachable second part, the first part comprising the bottom plate and the two abutting plates, the second part comprising the top plate.

10. An actuator, comprising:

a motor comprising a shaft, two end plates substantially perpendicular to the shaft, and two bosses respectively protruding from the two end plates along the shaft; and a casing housing the motor, wherein the casing comprises two abutting plates, each abutting plate comprising an arcuate resisting surface that substantially faces the other abutting plate and abuts against a corresponding end plate, a notch formed in an edge thereof and extending along the middle of the corresponding resisting surface, the two bosses being received respectively in the two notches, and lateral ends disposed on opposite sides of the corresponding resisting surface;

wherein in a direction parallel to the shaft, the distance between the two resisting surfaces increases from the middle to the lateral ends of the resisting surfaces of the abutting plates;

an arc of the resisting surface is formed between the lateral ends thereof, and the casing further comprises a bottom plate, wherein the two abutting plates extend from the bottom plate, and a protrusion protruding from the resisting surface of an abutting plate, the top end of the protrusion is equal to or below the bottom of the corresponding notch, and the protrusion comprises an arcuate surface that substantially faces the other abutting plate.

11. The actuator of claim 10, further comprising a plurality of first resisting pieces protruding from the bottom plate, wherein the plurality of first resisting pieces are arranged on a same side of a line passing through the centers of the two notches for abutting against the motor so that the motor is spaced from the bottom plate.

12. The actuator of claim 11, wherein two said first resisting pieces are arranged on each side of the line and are arranged respectively at a position near a corresponding abutting plate, each first resisting piece being shaped like a triangular prism and configured to contact the motor in a point-contact manner.

13. The actuator of claim 10, further comprising two supporting pieces protruding from the bottom plate, wherein the two supporting pieces are respectively connected to a surface of a corresponding abutting plate that faces away from the other abutting plate.

14. The actuator of claim 13, wherein each supporting piece is V-shaped with the tip of the V connected to the middle of said surface.

15. The actuator of claim 10, further comprising a top plate facing the bottom plate and a plurality of second resisting pieces protruding from the top plate, wherein the second resisting pieces are arranged on two opposite sides of the line for abutting against the motor so that the motor is spaced from the top plate.

16. The actuator of claim 15, wherein at least one of said second resisting pieces is arranged on each side of the line, each second resisting piece is shaped like a triangular prism and is configured to contact the motor in a point-contact manner.

* * * * *